Jan. 19, 1937.　　　　G. F. ROSE　　　2,068,247
TYPEWRITING MACHINE
Filed Feb. 2, 1933　　　7 Sheets-Sheet 2
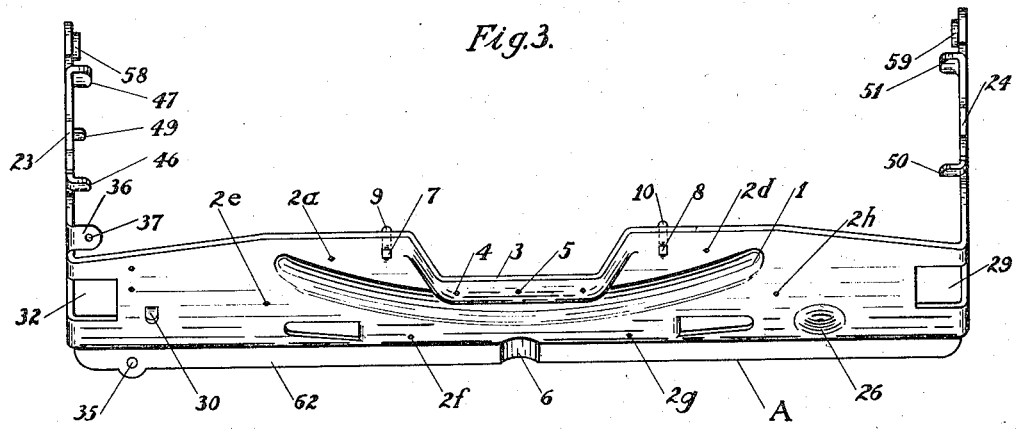
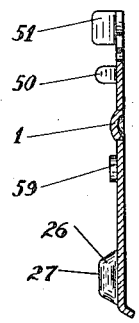
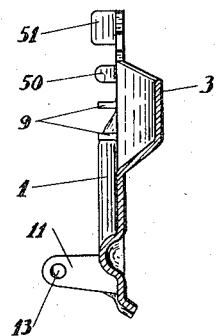
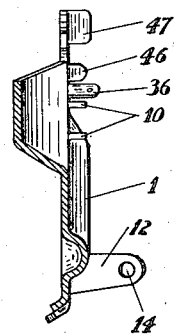
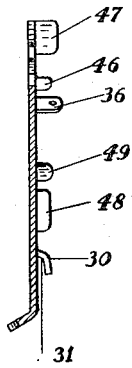
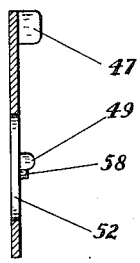
GEORGE F ROSE
INVENTOR
BY
Frank W. Cahill
ATTORNEY Jan. 19, 1937.　　　　G. F. ROSE　　　　2,068,247
TYPEWRITING MACHINE
Filed Feb. 2, 1933　　　7 Sheets-Sheet 3
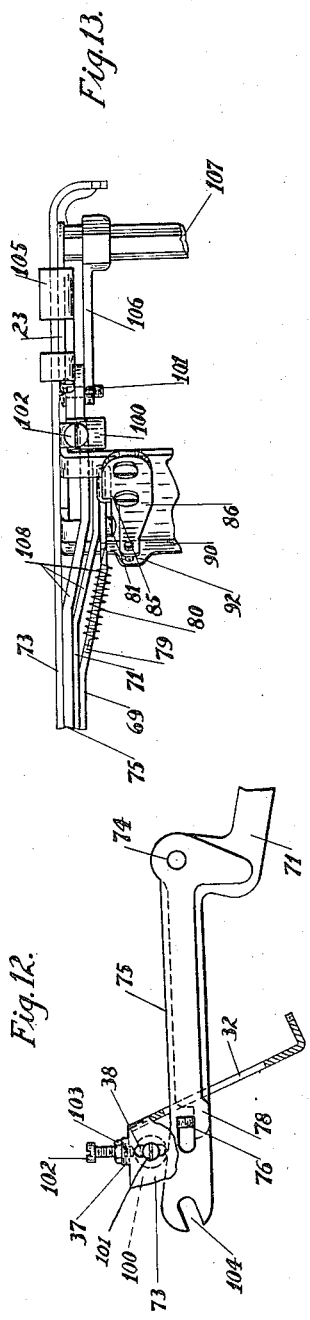
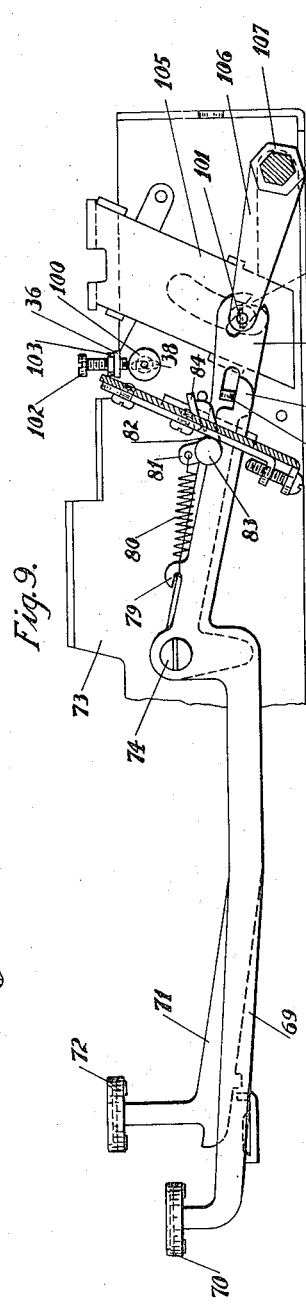
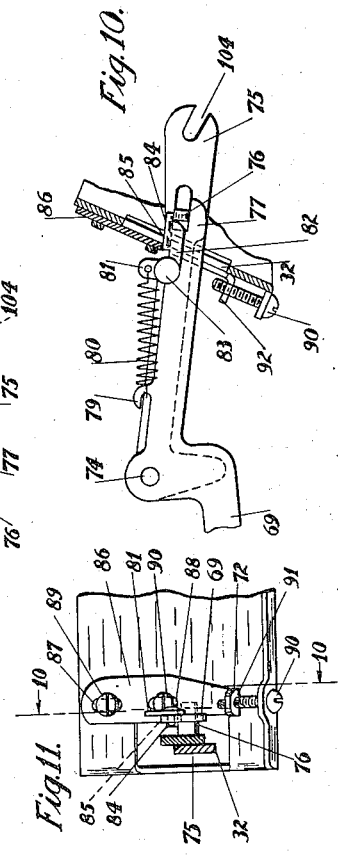
GEORGE F. ROSE
INVENTOR
BY
Frank W. Cahill
ATTORNEY

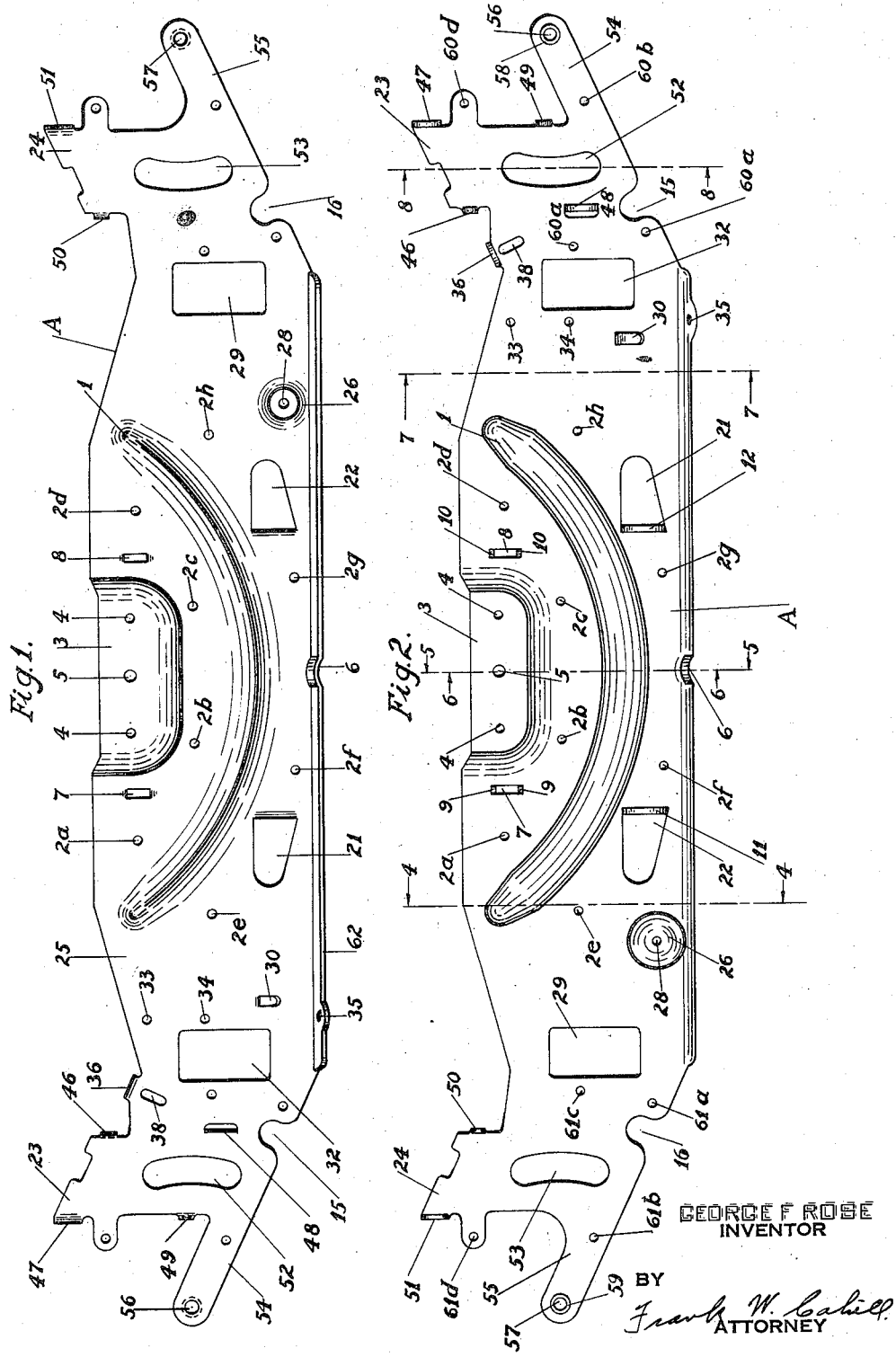

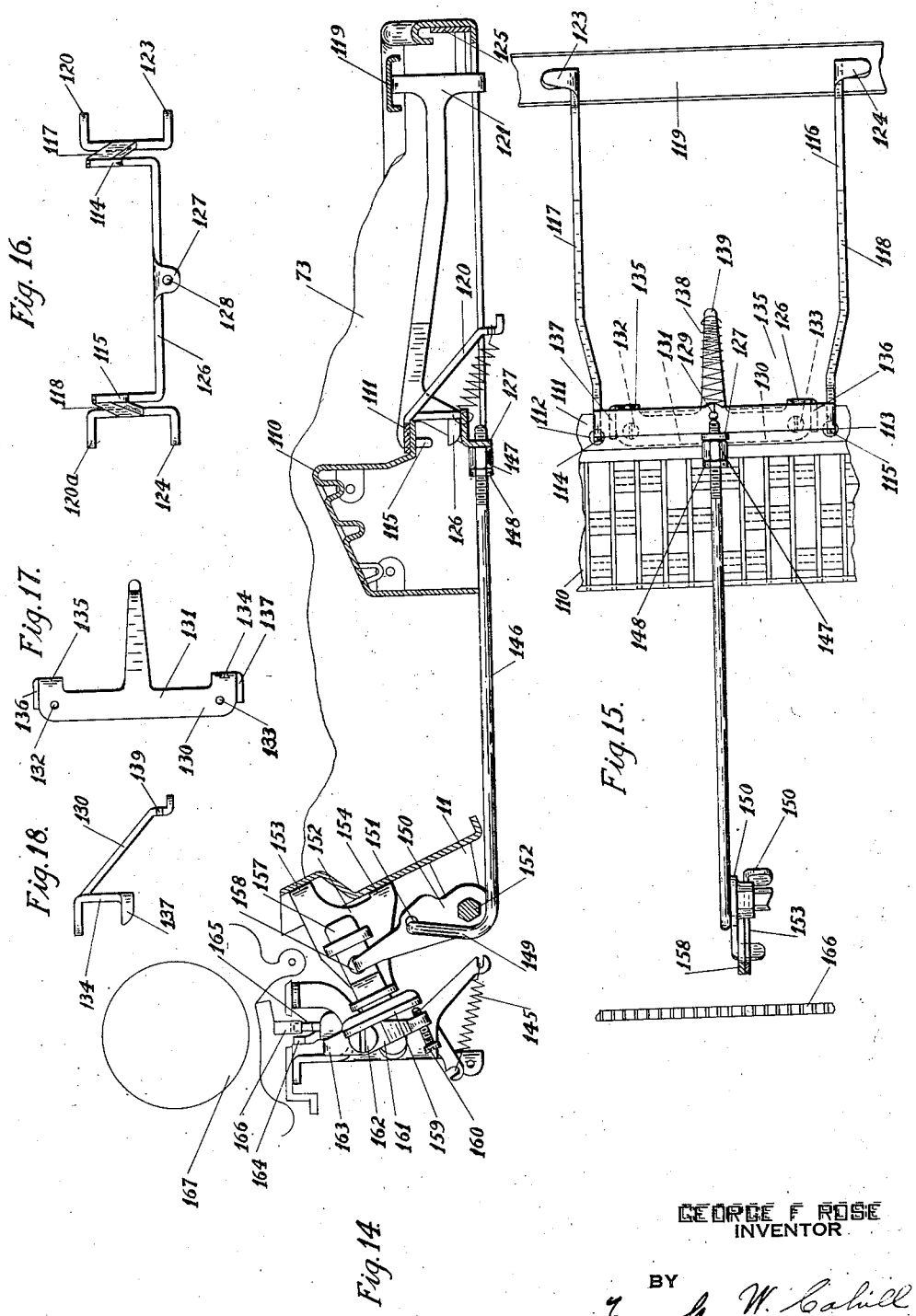

Jan. 19, 1937.    G. F. ROSE    2,068,247
TYPEWRITING MACHINE
Filed Feb. 2, 1933    7 Sheets-Sheet 5
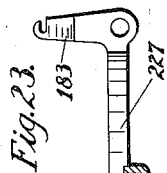
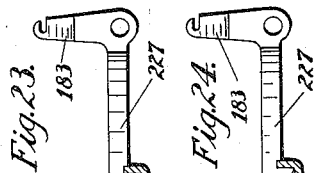
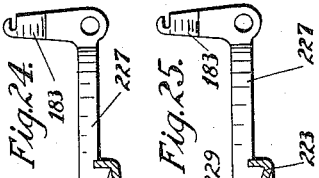
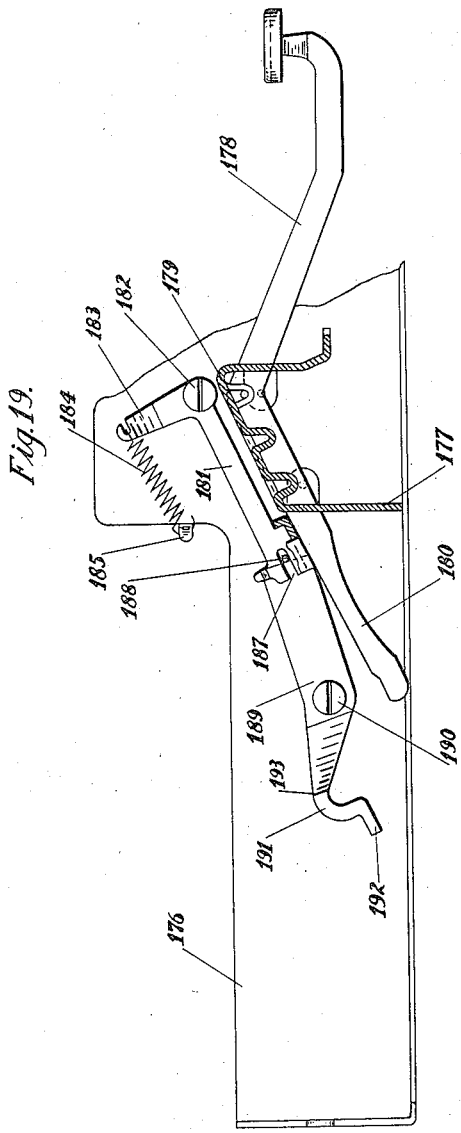
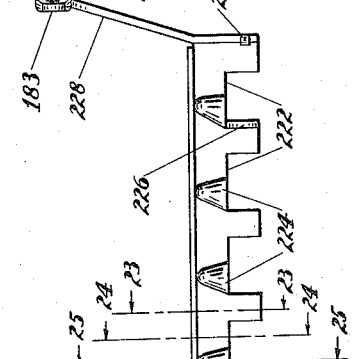
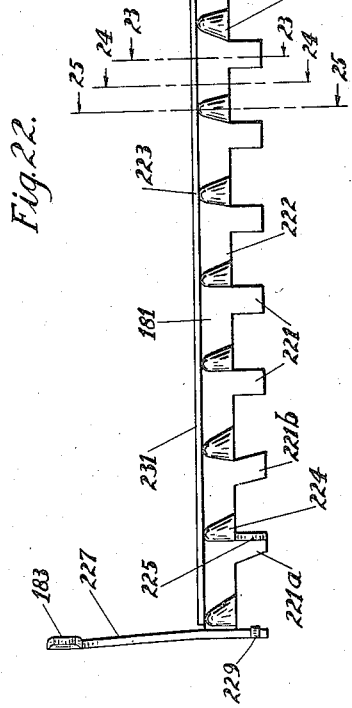
INVENTOR
GEORGE. F. ROSE
BY
Frank W. Cahill
ATTORNEY Jan. 19, 1937.  G. F. ROSE  2,068,247
TYPEWRITING MACHINE
Filed Feb. 2, 1933  7 Sheets-Sheet 6
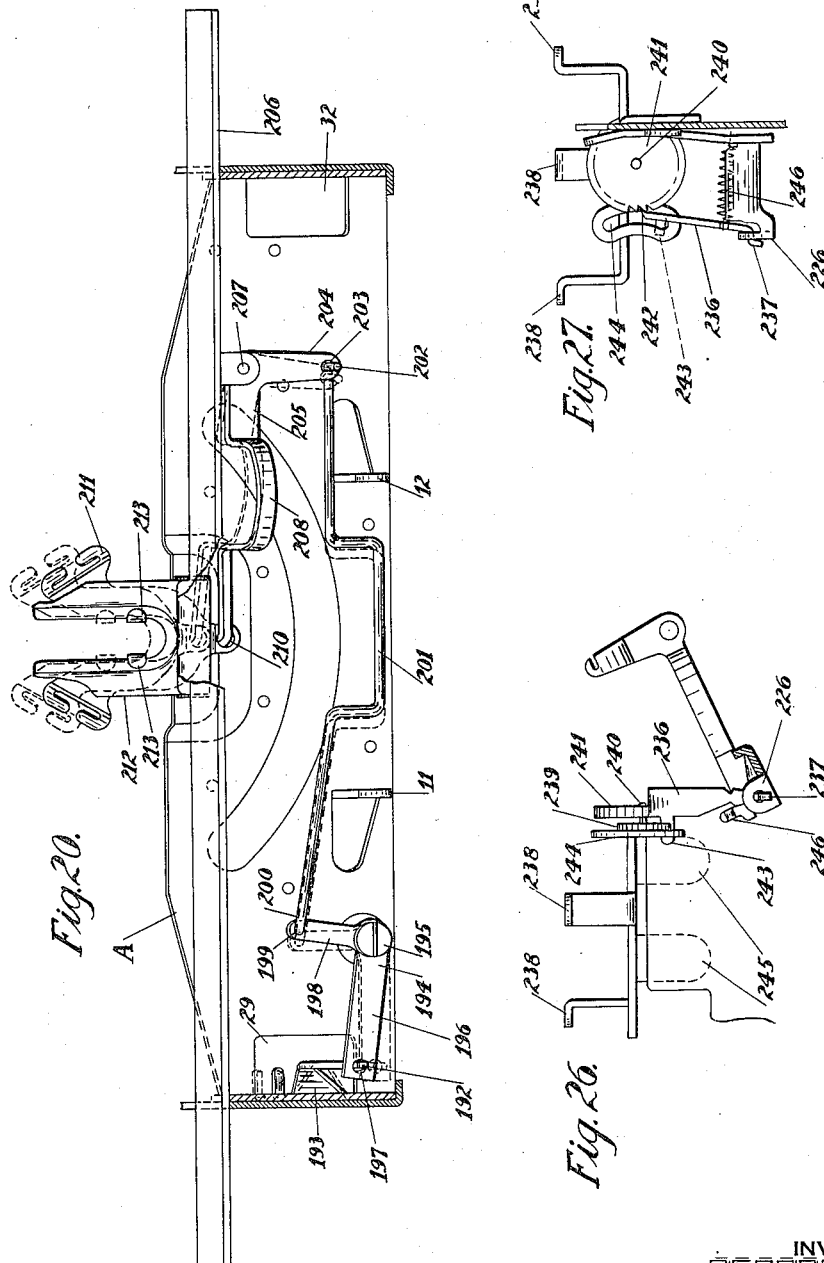
INVENTOR
GEORGE. F. ROSE.
BY
Frank W. Cahill
ATTORNEY Jan. 19, 1937.  G. F. ROSE  2,068,247
TYPEWRITING MACHINE
Filed Feb. 2, 1933  7 Sheets-Sheet 7

INVENTOR
GEORGE. F. ROSE.
BY
Frank W. Cahill
ATTORNEY

Patented Jan. 19, 1937

2,068,247

UNITED STATES PATENT OFFICE 2,068,247

TYPEWRITING MACHINE

George F. Rose, New York, N. Y.

Application February 2, 1933, Serial No. 654,862

31 Claims. (Cl. 197—186)

This invention relates to typewriters of the visible printing and striking type bar variety and more particularly to portable typewriters of the above class.

As is well-known, the essence of a successful portable typewriter is lightness and compactness without the sacrifice of efficiency and to these ends I have invented a segment plate that I believe to be novel per se and which co-operates with and supports, in a distinctive and novel manner, various other elements and mechanisms of the machine as well as acting as a cross-brace between the sides of the main frame.

The present invention deals with the segment plate, as such, and the method of making it, as well as its function of co-operating with members of a train of elements forming different mechanisms of the machines, in the latter connection might be mentioned the following mechanisms; the space bar, the case shift, the ribbon vibrator, the universal bar and the escapement, and others of lesser importance.

While, as suggested above, it is deemed that the invention will find its greatest utility in the field of portable typewriters it is, nevertheless, adaptable for use in conjunction with any class of typewriting machines. It has here been described, with relation to the other mechanisms, as it is generally used in the typewriting machines commercially known as the "Masspro."

The segment plate is preferably stamped from sheet metal, the finished article being produced in as many operations as are found to be necessary, in accordance with the manner in which the plate is formed and also in accordance with the way that the various other mechanisms are attached to it or work on it. This latter statement is deemed to be advisable because of the fact that with different kinds of typewriting machines it may become necessary, or at least expedient, to change the manner in which the various mechanisms operate, or, to remove one or more of the mechanisms entirely from the segment and attach it or them to a different element of the machine.

The above features will be more fully explained hereinafter, as well as additional advantages of the invention, and it is believed that they will be clear by reference to the accompanying drawings, which form part of this specification, in which drawings like reference characters indicate similar parts throughout the several views, the views being as follows:—

Fig. 1 is an elevation of the segment plate, looking from the front of the machine, with the end portions shown in the same plane with the body portion in order to facilitate the description;

Fig. 2 is a view similar to Fig. 1, except that it is taken from the rear of the plate instead of the front;

Fig. 3 is a perspective view, with the end portions turned back from the body portion and looking at the plate from above;

Fig. 4 is a sectional view taken on the line 4—4 of Fig. 2 and looking in the direction of the arrows;

Fig. 5 is a sectional view taken on the line 5—5 of Fig. 2 and looking in the same direction as Fig. 4;

Fig. 6 is a sectional view taken on the line 6—6 of Fig. 2, which is the same as line 5—5 but looking in the opposite direction;

Fig. 7 is a sectional view taken on the line 7—7 of Fig. 2 and looking in the direction of the arrows;

Fig. 8 is also a sectional view and taken on line 8—8 of Fig. 2 and also looking in the direction that the arrows point;

Fig. 9 is a side elevation showing the case shift mechanism;

Fig. 10 is a side elevation showing the actuating lever and the intermediate case shift lever (broken away) when they are in shifted position;

Fig. 11 is a front elevation of the adjustable stop means for the lever shown in Fig. 10;

Fig. 12 is a side elevation of the actuating lever and the upper case shift lever (broken away) when they are in shifted position;

Fig. 13 is a top plan view of Fig. 9;

Fig. 14 is a side elevation of the letter spacing mechanism with same elements in section;

Fig. 15 is a bottom plan view of Fig. 14 with the escapement omitted;

Fig. 16 is a rear elevation of the space bar itself;

Fig. 17 is a top plan of the space bar cap;

Fig. 18 is a side elevation of the space bar cap;

Fig. 19 is a side elevation of the front portion of the ribbon vibrator mechanism;

Fig. 20 is a rear elevation of the rear portion of the ribbon vibrator mechanism;

Fig. 22 is a top plan view of the ribbon vibrator universal bar;

Figure 21:
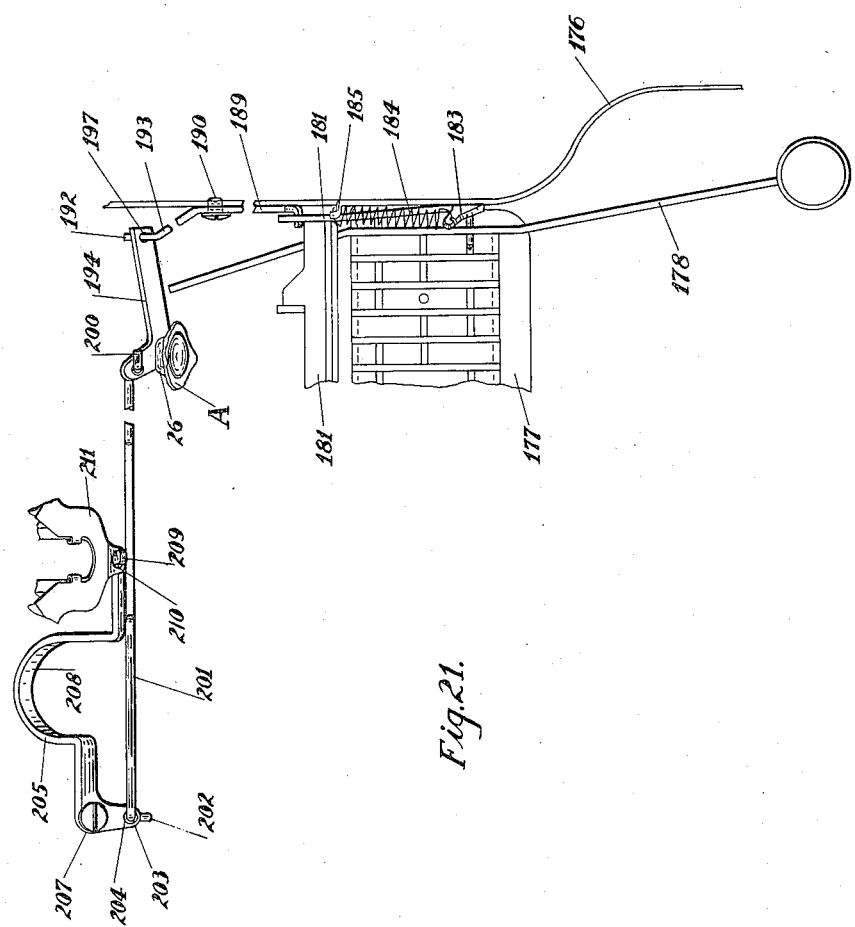
Fig. 21 is a top plan view of the entire ribbon vibrator mechanism.

Figs. 23, 24 and 25, are sections taken on the lines 23—23, 24—24 and 25—25 of Fig. 22.

Fig. 26 is a side elevation of the ribbon feed mechanism, and

Fig. 27 is a front elevation of the ribbon feed mechanism.

There are many details in connection with my segment plate, but for a clear understanding of the manner in which I prefer to make it and the manner in which it has been found preferable to use it, I think that all of these details should be described so that their relation to each other and to the remainder of the machine will be made clear.

At substantially the central portion of the plate A, there is a strengthening rib 1 which is of great importance, because it enables one to use material of much lighter weight than would otherwise be practicable in view of the strain placed upon the plate and the rib has further importance because it permits a much smoother and lighter operation of the various tools for cutting, punching, bending, etc., which advantage, in turn, lessens distortion and warping of the elements, which is only another way of saying it tends for greater precision and trueness of the finished product. This rib, in order to be of material advantage, must necessarily cover or traverse a substantial portion of the plate but at this point the difficulty of having a substantial strengthening rib and at the same time not interfering with other structural elements presents itself.

I have discovered that by forming the rib in an arc of approximately the contour shown in the drawings, intereference with the structure of the plate is completely overcome and the additional strength is added for a very substantial portion of the length of the body portion as well as extending from near the upper edge to a point near the lower edge. The rib is preferably drawn towards the rear side of the plate, that is, it is convex on the rear and concave on the front, thus keeping clear of the type-bar sector which may be fastened to the plate by means of screws being threaded into the openings 2a to 2h, located in any convenient manner. In this connection, I preferably use the type-bar sector shown and claimed in my Patent #1,572,159 of February 9, 1926, but, any suitable sector may be used.

In the upper part and at the center of the plate, is a portion 3, which is drawn forward and has any desired number of threaded openings 4 for the reception of screws to hold the type-bar guide in place and it may also have the additional opening 5 to accommodate a stud projecting from the type-bar guide which arrangement facilitates assembling the guide on the plate and also allows the same to be held thereto more rigidly. At the bottom edge and also located at the center of the plate, is a raised portion or indentation 6 to provide clearance for the connecting link of the space bar mechanism. This feature may or may not be desirable, depending on the structure of the particular machine.

Located near the upper edge are the openings 7 and 8 through which arms of the universal bar may reciprocate and be guided by the rearwardly extending lugs 9 and 10 which act as bearings and guides for the above-referred to bars, thus providing smoother movement of them.

Near the lower edge of the plate, and also projecting rearwardly are ears 11 and 12 arranged for retention and operation therein of the rocker shaft for actuating the escapement. At a convenient point in the ears 11 and 12, will be found the openings 13 and 14 (Figs. 5 and 6) in which the bearing portions of the rock shaft may be journaled. When the ears 11 and 12 are lanced, i. e. three sides are cut from the body portion and they are bent back on the fourth side, the openings 21 and 22 will be the natural result. The manner in which the connection is made between the arms of the universal bar that extend through the openings 7 and 8 to the rock shaft journaled in the ears 11 and 12, will be explained later, but one such arrangement may be seen by reference to my Patent #1,715,428, of June 4, 1929. As indicated at 15 and 16 sections may be cut away to permit of insertion of a tool for assembling the rocker shaft in the ears 11 and 12.

During the process of making the plate, which will be described more in detail hereinafter, the end portions 23 and 24 are cut so that their upper and lower edges extend upwardly at an angle, to the horizontal plane of the body portion 25, which construction provides a rearwardly slanting position for the body portion when the end portions have been bent backwardly and have their lower edges lying in a plane substantially parallel to the horizontal. The result of bending back these inclined end portions may be observed by referring to Fig. 3, this figure disclosing the finished segment plate when the lower edges of the end portions are lying in a plane substantially parallel to the horizontal; the inclined position of the body portion 25 being clearly shown. The angle of inclination of the segment plate permits of a substantial lowering of the carriage platen while at the same time it affords an arrangement whereby the key bars are swung through the proper arc to impart an easy "touch" to the key levers, in the instance of the "Masspro" portable, through an arc in excess of 90 degrees.

At a convenient point a boss 26 is drawn rearwardly from the body portion and is flattened on its top, as shown at 27, and has a screw-threaded opening 28 therein in which a pivot may be held for the pivotal retention of a bell crank or other moving element of the ribbon vibrator mechanism. By flattening this top portion there is provided substantial bearing surface against which the above-referred to moving element may work. To one side of the boss 26 is the opening 29 of any suitable shape through which an actuating element of the ribbon vibrator mechanism may move, and, at the rear side of the plate, be connected to the moving element which is pivoted to the boss. If the moving element be a bell crank, oscillating in a plane substantially parallel to the plane of the body portion 26, as in the preferred embodiment of the invention, then the actuating member which extends through the opening 29 would reciprocate up and down in this opening and hence provision should be made in its shape and size to permit of the proper degree of reciprocation therein. The ribbon vibrator mechanism itself and in combination with the segment plate, will be described hereinafter.

Preferably on the side of the plate opposite to the boss 26, is stamped out a hook 30 to which is anchored one end of the balance spring for shifting of the carriage and carriage support. This hook when in the making is lanced and at the same time a slight indentation 31 (Fig. 7) is provided for the purpose of securely holding the end of the spring in place.

Also on the side of the plate opposite to the opening 29 is an opening 32 of suitable size and shape to permit elements of the case shifting mechanism to extend therethrough and work therein, the detail of this mechanism also will be described in detail later. In the preferred form of my case shifting mechanism it is desirable to provide adjustable stop members for the case shifting lever, or levers, as the case may be, and these adjustable stops are attached to the segment plate, the threaded openings 33 and 34 being provided to retain one of the stops in place but to permit of adjustment thereof when the screws threaded into these holes are loosened and an adjusting screw extending through unthreaded opening 35 and threaded into the stop is turned to permit of adjustment either upwardly or downwardly. Located in the end portion 23 and bent at right angles thereto is a supporting lug 36 for the other shift lever stop having therein an opening 37 while directly below the supporting lug is a slot 38 arranged whereby a screw extending therethrough and threaded into the shift lever stop will permit of upward or downward movement of the stop when the screw threaded into the opening 37 is either tightened or loosened. Of course, when the proper adjustment has been made, the screw extending through the slot 38 should be made tight in order to clamp the stop securely against the side of the end portion. Any suitable adjusting means may be used and the arrangement of the openings, etc., may be arranged accordingly.

On the end portions 23 and 24 is provided a means in which guide posts attached to the carriage support or bed plate may work freely in an upwardly and rearwardly direction, but at the same time be prevented from wobbling from their normal paths. On the end portion 23 are shown inwardly extending lugs, 46, 47, 48 and 49 which provide a four-point guiding means thereby preventing binding of the posts as would be the case if either the upper or the lower end could move from its normal path. On the end portion 24 are shown lugs 50 and 51 which are similar to lugs 46 and 47 respectively but, at this end, are not shown guide lugs similar to 48 and 49 and by omitting these latter two lugs there will not be any binding action if the guide posts happen to be slightly out of line with one another. I have found it preferable to place the four-point guiding means on the same side as the case shifting mechanism is located when only one such mechanism is used, but if there is a case shift lever on each side of the machine there should be a similar arrangement of guide lugs on each side. The curved slots 52 and 53 facilitate the assembling, that is, attaching the shifting mechanism to the guide posts, the screws for this purpose being insertable from the outside of the frame and they work up and down in the slots. At the lower edges of the end portions are rearwardly extending arms 54 and 55 having near the rear extremities thereof openings 56 and 57 for the reception of pivotal points of the case shifting rocker bar and when these openings are formed all of the metal is not cut out completely but is drawn and forms the integral extensions 58 and 59, of an inside diameter the same as the openings 56 and 57 thus providing a bearing for the case shift rocker bar of greater thickness than the thickness of the end portions.

As has already been stated, the end portions 23 and 24 form a substantial part of the segment plate and, as is clearly shown in Fig. 3, offer a comparatively large surface to be attached to and lie flush with the sides of the main frame, thereby adding a great deal more rigidity thereto than would be the case if the segment plate merely had the conventional lugs bent back for attachment to the frame. For the purpose of securing the end portions to the frame I prefer to provide screw-threaded openings, at convenient points, such as the openings 60a, 60b, 60c, and 60d, shown in the end portion 23, and openings 61a, 61b, 61c and 61d, in the end portion 24 (Fig. 2), these openings to coincide with similar openings, in the sides of the main frame. Of course this attaching means may be varied to comply with the conditions of different machines, but when the construction disclosed is utilized, it may be seen that there are eight points at which the parts are secured together and they are spread over a very substantial area so that even if one or more of the screws should work loose the elements will still be securely held together.

Along the lower edge of the plate is an additional strengthening means 62 which comprises a flange bent forwardly, at approximately right angles or any convenient angle, to the body portion 25 and extending for approximately the entire length thereof. This strengthening flange 62 has located therein the opening 35 for the adjusting screws of one of the carriage shift lever stops as well as the raised portion 6, the latter two features already having been described.

Figs. 4 to 8 inclusive, are sections taken on the lines as indicated heretofore and are merely for the purpose of better illustrating the various details of the plate, the reference numerals indicating the same parts as they do in Figs. 1, 2 and 3.

Due to the novel construction of the segment plate it has many and varied structural features but the manner in which they are arranged imparts to it such remarkable utility and gives it such a wide range for supporting and co-operating with other elements and mechanisms that it is, in the final analysis, very simple. The method of producing the plate offered many difficulties which were surmounted only by much experimentation and, while it was found that some of the features could be added at varying points during the process without considering either those already added or to be added, this condition did not apply to a great majority of them, particularly the more important ones. In the stamping process I have obtained best results by first drawing the strengthening rib in the blank and at the same time piercing the opening 35; with this opening pierced in the blank the flange 62 can be cut out and turned in the second stage of the first operation, and in this manner I obviate the necessity of a separate operation to pierce this opening which would be the case if the piercing were not done prior to the turning of the flange, and at the same time prefer to draw the type bar guide supporting portion 3. The indentation 6 is put in at the same time that the flange is formed. The third stage consists mainly of piercing and I preferably include the openings 29 and 32, the rear openings 60b, 60d, 61b, and 61d, for attaching to the frame, the slots 52 and 53 and the shift lever stop adjusting slot 38 and opening 37.

The above three stages preferably comprise the first operation and the second operation is also accomplished in three stages. The first stage consists of drawing the boss 26, lancing around

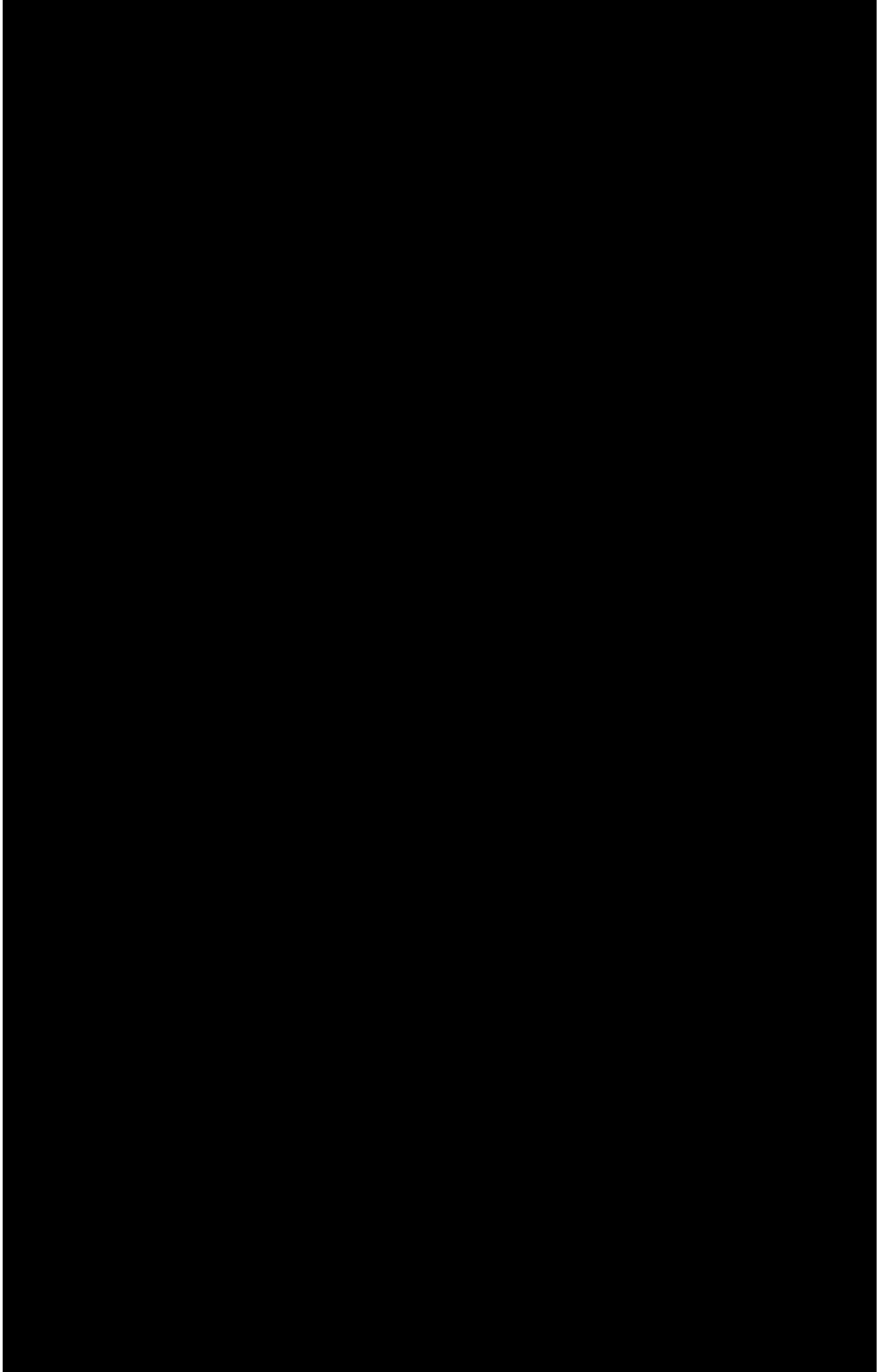

the actuating lever 75 will raise the latter, the fork 104 of lever 75 straddling the screw 101 which is connected with the carriage guide post 105 will raise it the proper distance, i. e. to the stop 86 or the stop 100. The shift guide post 105 will be guided in its movement by the guide lugs 46, 47, 48 and 49, which are preferably integral with the segment plate. The carriage assembly is not shown but may be any conventional assembly and will be mounted on the carriage guide posts.

Fig. 13 shows the manner in which the three levers are offset at 108 on the end to the rear of the pivot 74 in order to clear the bent back portion 23 of the segment plate and the guide post 105.

The space bar mechanism is shown in Figs. 14 to 18 inclusive, the main frame 73 being broken away and showing only sufficient of it for the purposes of description. Toward the forward end of the frame is a key lever support 110 which is preferably of the construction shown in my Patent #1,524,885 of February 3, 1925 having a ledge 111 at its forward edge with openings 112 and 113 in the ledge for the reception therein of downwardly extending lugs 114 and 115 of the space bar 116, these lugs being extensions of the arms 117 and 118, which are connected by the space bar plate 119 which is preferably spot-welded to the turned portions 120 and 120a (Fig. 16) there being one of these turned from the upper end of each cross arm 121 and 122 and similar portions 123 and 124 on the lower ends of the cross arms to co-operate with an element 125 (Fig. 14) to act as a stop for both up and down movement of the space bar. The rear ends of the arms are connected by the cross member 126 which lies below the lugs 114 and 115, and has the depending lug 127 and an opening 128 therein. There is also an opening 129 in the cross member, the purpose of which will be described later. As the lugs 113 and 114 are only loosely hung in the openings 132 and 133 of the ledge 111 it is necessary that some provision be made to prevent their being dislodged by jars or jolts or by operation of the machine and to this end I provide a retaining cap 130 (Figs. 17 and 18) which lies within the arms 117 and 118, the body portion 131 being attached to the ledge 111 by means of screws extending through the openings 132 and 133. At the ends of the cap are the legs 134 and 135 turned down from the body at approximately right angles thereto and having the rearward extensions 136 and 137 which lie slightly above the connecting member 126 of the bar 116 and thus will prevent too great upward movement of the cross member 126. The spring 138 is attached at one end to the cross member 126 through the opening 129 and at the other end to the offset portion 139 of the cap 120 and thus will return the space bar to normal position.

Extending through the opening 128 of the lug 127 (Fig. 16) and lying loosely therein is a connecting link 146 having at its forward end threads for reception of the sleeve nut 147 which rests against the lug 127 and is locked by the lock nut 148. The rear end of the link is curved upward as indicated at 149 and is attached to the rocker arm 150 in any suitable way but I prefer to flatten out the tip at an angle so that when it is inserted through the opening and placed in its normal position the flattened tip will be crosswise of the opening thereby preventing it from slipping back out. The opening 151 is slotted so that when the escapement is actuated other than by the space bar, movement will not be imparted thereto. The lower end of the actuating arm 150 is rigidly attached to the pivoted cross member 152 and its upper end is connected to any conventional type of escapement or one as is shown and described in my Patents Nos. 1,677,210 and 1,717,428, the present escapement being substantially the same as those except that parts of it are supported by my new segment plate. The arm 150 is actuated by rearward movement of the link 146, the cross rod 152, to which the arm 150 is fastened has its ends journaled in the ears 11 and 12 of the segment plate, the escapement slide bracket 152 has feet 153 and 154 attached to the segment plate either by spot welding or by screws and a third foot attached in the guide support portion 3, and has straps or guides 155 and 156 through which the escapement actuating slide 157 works, there being an opening 158 therein for the reception of the upper end of actuating arm 150 which when actuated forces the lower end 159 of the escapement actuating slide 158 against the screw 160. The part 159 extends high enough to take care of the case shifting of the carriage. When the screw 160 is depressed it will cause the lever 161, into which it is screwed, to pivot on the pivot 162, the upper end 163 will force an escapement frame forward, against the spring 145 operating the rigid pawl 164 and the loose pawl 165 in the usual manner and these pawls cooperating with the rack bar 166 of the carriage 167 will permit it to move for the letter spacing.

The rear portion of Fig. 15 has most of the escapement mechanism omitted, it merely indicating that the link 146 may be connected to a member similar to the escapement actuating slide 157, the remainder of the escapement being between the slide 157 and the rack bar 166.

Figs. 19, 20 and 21 show the action of the ribbon vibrator mechanism and the manner in which its elements are co-ordinated with the segment plate. In Fig. 19 a portion of a frame 176 is shown with a key lever support 177, which preferably is of the type shown in my Patent #1,524,885, but may be of any conventional type and has the usual number of key levers, one of them being indicated by the numeral 178, working on the pivot 179, while extending across the rear portion 180 of the key levers is a ribbon universal bar 181, which will be described in detail in connection with Figs. 22 to 25 inclusive, and it is pivoted to the side of the frame at 182 and has the upstanding portion 183 with one end of the spring 184 attached thereto and its other end attached at any convenient point, such as to the side of the frame at 185. At the rear end 186 of the ribbon universal is an open ended slot 187 and working in this slot is a lug 188 which, preferably, is integral with a rocker arm 189 and is pivoted to the side of the frame as at 190 and has a hook 191 at its rear end with a straight tip 192 extending rearwardly from the hooked portion 191. Slightly to the rear of the pivot 190 the rocker arm is preferably curved inwardly from the frame as at 193 (more clearly shown in Figs. 20 and 21) in order to give clearance between the tip 192 and the side of the frame.

Fig. 20 is a rear view, being a continuation of the elements of the vibrator mechanism, and, shown in dotted lines, are the elements when the vibrator is in its raised position. Fig. 21 is a top plan view showing only such parts as are necessary for the operation of the vibrator with practically all of the segment plate omitted to show the elements to the rear thereof and it is believed that these two figures can be described together. The segment plate A having the boss 26 thereon supports the bell crank 194 pivoted by means of the pivot 195 and has in the arm 196 thereof the opening 197 for reception of the tip 192 of the rocker arm which extends through and works in the opening 29 of the segment plate. The other arm 198 has the opening 199 near its uppermost end in which is retained the end 200 of the connecting link 201 and is slightly offset from the body of the link in order to keep from slipping out of the opening. The link is in such form that it will move back and forth without interfering with any other elements such as the rearwardly extending ears 11 and 12. At the opposite end of the link is the portion 202 bent forwardly and downwardly and inserted through the opening 203. The opening 203 is located in a downwardly extending arm 204 of the ribbon vibrator actuating crank 205 which is pivoted to the carriage bed plate 206 (Fig. 20) by the pivot 207. The actuator 205 has a rearwardly extending loop 208 therein in order to prevent interference with other elements of the machine and at the opposite end of the actuator arm 205 is the offset portion 209 protruding thru the opening 210 of the ribbon vibrator 211, the vibrator being held for upward and downward movement on the paper guide 212 (partly broken away) by the tabs 213 which are bent around the paper guide. The operation of this vibrator is as follows: When the key lever 178 is pressed it will in turn raise the universal bar 181 thus raising the forward end of the rocker arm 189 which lowers its rearward end and the tip 192 being positioned in the opening 197 of the bell crank 194 will cause it to pivot on the pivot 195 thus pulling the link 201 toward the right hand side of the machine which action pivots the actuator 205 raising the end 209, and, consequently, the vibrator 211 upwardly. When pressure has been removed from the key lever 178 the spring 184 will return the parts to their normal position.

Looking at Fig. 20 it will be noticed that the link 201 extends for almost the entire width of the machine and this arrangement is used in order to compensate for the shifting of the carriage, i. e. to give substantially the same throw to the actuating arm 205 in each of the shifted positions, of the carriage. Facing this figure it will be noticed that the right hand end of the link is slightly below the left hand end and when the carriage is shifted to intermediate case the ends will be in approximately the same plane and in upper case the right hand end will be approximately the same distance above the left hand end as it is below in the lower case or normal position.

In Figs. 22 to 25 inclusive, the ribbon universal bar is shown in detail. Due to the different heights of the pivots of the different banks of key levers, three being indicated in the drawings, and the different distances of the pivots from the point of contact with the ribbon universal, it becomes necessary to have them contact with the universal at different vertical planes thereon, and at different lateral points, in order to obtain a uniform lift of the universal bar and to this end I have provided the extensions 221 against which the bank of key levers pivoted highest will contact, the pivots of the intermediate bank contacting with the intermediate portions 222 while the pivots of the lowermost bank will contact with the edge 223 due to the raised portions 224, being lifted above the plane of the edge 223. The extension 221, the portion 222 and the edge 223 would lie in the same horizontal plane were it not for the fact that the universal bar is inclined when in normal position, as is clearly shown in Fig. 19, at the same angle of indentation as that of the pivots 179. It will be noticed that the pivots of the lowermost bank of key levers are highest, those of the intermediate bank are lower and those of the highest bank are lowest.

Referring again to Fig. 22 it will be seen that the extensions 221a and 221b differ in shape slightly from those of the other extensions and this difference is to conform to the particular type of key board with which the universal bar was used. On the bar, and preferably integral therewith, are the standards 225 and 226, the use of which is described in connection with Figs. 26 and 27, which may be integral with the extensions and located on whichever ones best suit the construction of the machine. The rearwardly extending arms 227 and 228 are bent at an angle to the body of the bar so that the pivot end thereof will lie close to the frame. The upstanding portions 183, as already explained, are for the purpose of retaining one end of the spring 184. At one end of the arms 227 and 228 are the standards 229 and 230 respectively which retain one end of the spring 246 (Fig. 27) and a similar spring at the opposite side. Along the rear edge is provided an upstanding flange 231 for the purpose of strengthening the bar.

Figs. 23, 24 and 25 are believed to be clear from the description of Fig. 22. These three figures are mainly for the purpose of clearly illustrating how the contact points of the key levers with the universal bar are at three different elevations. Fig. 23 shows the extension 221 for the lowest bank of key levers; Fig. 24 the portions 222 for the intermediate bank and Fig. 25 the edge 223 for the highest bank as well as the raised portion 224. The universal bar 181, like the other elements, is preferably stamped from sheet metal.

The ribbon feeding mechanism is also actuated by the ribbon universal bar and this mechanism has been shown in Figs. 26 and 27. Referring to these figures the pawl 236 is loosely retained in the lug 226 by the offset portion 237, above the pawl are supports 238 for the ribbon cups (not shown) and extending downwardly from the ribbon cups will be the usual shafts having a gear wheel thereon to mesh with another gear wheel 239 the latter being on the same shaft 240 as ratchet 241 the teeth of which will be engaged by the upper sharpened end 242 of the pawl 236. This upper end is guided and held in position by the lug 243 extending thru the curved slot 244 and bent around one side thereof. The whole mechanism may be fastened to the side of the frame by the downwardly extending tabs 245. The pawl is urged toward the ratchet by means of the spring 246 which has one end attached thereto and the other end fastened to the upright standard 229 of the ribbon universal bar. In order to remove the positive action of one pawl and ratchet from its corresponding ribbon spool any conventional means may be employed such as moving the gear wheel 239 from the gear wheel which normally is on the ribbon spool shaft.

Throughout the specification and claims where I have used the term "segment plate" or "segment" I have referred to that element of a typewriting machine which normally supports the sector, or element in which the type bars are pivoted, and if the segment plate is not integral with the sector then it is normally immediately behind the sector.

Where the terms "forward", "rearward" or similar expressions have been used they are to be construed as meaning the front and rear of the machine when one is facing it in position for operation, and where "in" or "inwardly" have been used or "out" or "outwardly" they should be construed as meaning toward the center from the outside of the machine or toward the outside of the machine from the center thereof.

1. A typewriting machine segment plate including substantial portions of the ends turned back from the body of said plate, bearings in said turned-back portions and arranged for reception of the carriage shifting rocker bar.

2. A typewriting machine segment plate including substantial portions of the ends turned back from the body of said plate, bearings in said turned-back portions drawn to greater thickness than the material of said plate and arranged for reception of the carriage-shifting rocker bar.

3. A typewriting machine segment plate including substantial portions of the ends turned back from the body of said plate, bearings in said turned-back portions, guiding means also in said turned-back portions arranged to guide the carriage during shifting movement said guiding means being located between said bearings and the body portion of said plate.

4. A typewriting machine segment plate including a strengthening rib thereon, turned back portions at the ends thereof, means on said turned back portions for fastening said plate to the sides of the frame of the machine, and integral rearwardly extending ears arranged to support a rocker-bar of the letter-spacing mechanism.

5. A typewriting machine segment plate including turned back portions at the ends thereof, means on said turned back portions to fasten said plate to the sides of the frame of the machine, openings in the upper portion of said plate for reception of guide arms of the universal bar and projections rearwardly extending from said openings to guide said universal bar and act as bearings for said arms.

6. A typewriting machine segment plate including portions at the ends turned back from the body portion, carriage shift rocker bar bearings in said turned back portions and integral therewith, universal bar bearings in said body portion and integral therewith.

7. A typewriting machine segment plate including a strengthening rib, portions at the ends turned back from the body portion, a raised section extending forwardly at approximately the center of said body portion and arranged for reception of a type bar guide.

8. A typewriting machine segment plate including a strengthening rib, portions at the ends of the plate turned back from the body thereof, an opening in said plate arranged to permit movement therein of the ribbon vibrating mechanism, a boss on the body portion of the plate and arranged to pivotally retain a portion of the ribbon vibrating mechanism.

9. A typewriting machine segment plate including a strengthening rib, portions at the ends of the plate turned back from the body thereof, bearings in said turned back portions arranged to accommodate the carriage shifting cross-rod, a means integral with said plate and arranged to retain one end of a balance spring the other end of which is fastened to the carriage shifting rocker bar.

10. In a typewriting machine the combination of a main frame, a carriage bed plate shiftable on said frame, a carriage platen arranged for transverse movement on said bed plate, shift key levers arranged for pivotal movement, with a segment plate having an opening therein, said opening being arranged to permit up and down movement therethrough of said levers, adjustable stops carried by said segment plate and arranged to limit the movement of said levers.

11. In a typewriting machine the combination of a main frame, a carriage bed plate shiftable on said frame, a carriage platen arranged for transverse movement on said bed plate, a shift key lever arranged for pivotal movement, with a segment plate having an opening therein, said opening being arranged to permit up and down movement therethrough of said lever, a stop carried by said segment plate adjacent said opening and arranged to limit the movement of said lever.

12. In a typewriting machine the combination of a main frame, a carriage bed plate shiftable on said frame, a carriage platen arranged for transverse movement on said bed plate, shift key levers arranged for pivotal movement, with a segment plate having substantial portions of its ends turned back from the body portion, an opening through said body portion, said opening being arranged to permit up and down movement therethrough of said levers, a stop on said body portion to limit the movement of one of said levers and a stop on one of said turned back ends to limit the movement of another of said levers.

13. In a typewriting machine, the combination of a main frame, a carriage bed plate shiftable on said frame, a carriage platen arranged for transverse movement on said bed plate, shift key levers arranged for pivotal movement, with a segment plate having substantial portions of its ends turned back from the body portion, an opening through said body portions said opening being arranged to permit up and down movement therethrough of said levers, and guide posts attached to said carriage bed plate, guides in said turned back portions in which said guide posts work, a carriage shifting rocker bar having an end journaled in each of the turned back portions of the segment plate, rocker-arms on said rocker bar attached to said guide posts whereby when a shift lever is pressed both sides of said carriage support will be raised simultaneously.

14. In a typewriting machine the combination of a main frame, a carriage bed plate shiftable on said frame, a carriage platen arranged for transverse movement on said bed plate, shift key levers arranged for pivotal movement, with a pivoted case-shift actuating lever, a segment plate having a portion of its ends turned back from the body portion, an opening in said body portion arranged to permit up and down movement therethrough of said levers and said actuating lever, guide posts attached to said carriage bed plate, guides in said turned back portions in which said guide posts work and a means whereby when one of said shift keys is pressed they will effect a case-shifting movement of said carriage supports.

15. In a typewriting machine the combination of a main frame, a key lever support, a carriage platen movable transversely of the frame, an escapement mechanism to control movement of said platen, with a space bar support pivotally hung in said key lever support, a segment plate having ears cut from the body portion thereof, and turned back therefrom to form a support for the escapement rock shaft, said escapement rock shaft being journaled in said ears, a rocker arm on said shaft arranged to actuate the escapement, a link connecting said rocker arm with said space bar support and a non-rigid connection between the link and said space bar support.

16. In a typewriting machine the combination of a main frame, a key lever support, key levers pivotally mounted in said support and connected to key bars to actuate them for printing action, a carriage platen movable transversely of the frame, an escapement mechanism to control movement of said platen, an escapement operating universal bar arranged to be actuated by said key bars, with a space bar support pivotally hung in said key lever support, a segment plate having openings therein through which arms of the escapement universal bar work, ears cut from the body portion of said segment plate and turned back therefrom, an escapement rock shaft journaled in said ears, a rocker arm on said shaft arranged to actuate the escapement, a slot in said rocker arm, a link connecting said rocker arm and said space bar support, said link and said slot cooperating to prevent movement of said space bar when said rocker is actuated by said universal bar.

17. In a typewriting machine the combination of a main frame, a key lever support, key levers pivotally mounted in said support, with a pivoted ribbon universal bar arranged to be actuated by said key levers, a pivoted rocker arm arranged to be actuated by said universal bar, a segment plate, an opening in said segment plate one end of said last mentioned lever being arranged for up and down movement through said opening, a boss on the rear of said segment plate, a pivoted member attached to the boss and moved by said actuated member, a connecting link or member connecting the member pivoted to the boss to the ribbon vibrating arm whereby when a key lever is pressed the ribbon vibrating arm will move the ribbon vibrator.

18. In a typewriting machine the combination of a main frame, a key lever support, banks of key levers pivotally mounted in said support, with a pivoted ribbon universal bar mounted above said levers, said universal bar having portions at different horizontal levels to compensate for the variation in height of the pivots of the different banks of key levers as well as the variation in distance, horizontally, of the key lever pivots from the point of contact of the levers with the ribbon universal bar whereby said universal bar is moved a uniform distance by each bank of key levers.

19. In a typewriting machine the combination with casing side walls, of a segment plate provided with a centrally located arcuate strengthening rib projecting above the rear face of the segment plate, the curvature of said rib coinciding with the curvature of the type bar sector arranged to be attached to the front face of said plate and integral rearwardly extending portions at the ends of the segment plate arranged to be secured to said casing side walls, whereby said segment plate forms an intermediate cross brace between the casing walls.

20. In a typewriting machine the combination with casing side walls, of a segment plate provided with a centrally located arcuate strengthening rib extending longitudinally of said plate, said arcuate rib projecting above the rear face of the segment plate and having its ends near the upper edge of the segment plate and its center near the lower edge of the plate, said rib coinciding with the curvature of the type bar sector which is arranged to be attached to the front face of said plate and rearwardly extending integral means for attaching said segment plate to the casing side walls.

21. In a typewriting machine the combination with casing side walls, of a segment plate provided with integral rearwardly extending portions at its ends providing for attachment of the segment plate to the casing side walls, a shiftable platen carriage supporting frame and inwardly extending lugs on said rearwardly extending portions for guiding said shiftable carriage supporting frame.

22. In a typewriting machine the combination with casing side walls, of a segment plate provided with integral rearwardly extending portions at the ends thereof for attachment to the casing side walls, said segment plate being inclined rearwardly from a vertical plane, a shiftable carriage supporting frame, the shift of the carriage being parallel to the segment plate and angularly disposed shift guiding means on said rearwardly extending portions for said shiftable carriage frame.

23. In a typewriting machine the combination with casing side walls, of a segment plate provided with integral rearwardly extending portions at its ends for attachment to the casing side walls, a carriage supporting frame, a plurality of guide lugs projecting inwardly from said rearwardly extending portions for positioning said carriage supporting frame and guiding it during case shift movement, certain of said lugs being located adjacent the upper edge of the casing side walls and others near the lower edge.

24. In a typewriting machine the combination with casing side walls, of a segment plate provided with a transversely extending arcuate strengthening rib and integral rearwardly extending portions at its ends for attachment to the casing side walls, carriage shifting mechanism and ribbon vibrating mechanism, said segment plate being provided with openings between the rib and said rearwardly extending portions through which portions of said carriage shifting and ribbon vibrating mechanisms are arranged to extend and in which they operate.

25. In a typewriting machine with casing side walls upon which portions of the case shifting and ribbon mechanism are mounted, the combination therewith of a segment plate provided with an arcuate strengthening rib and integral rearwardly extending portions at its ends for attachment to the casing side walls, the concave side of said arcuate rib being upward and said segment plate being provided with openings near each end between the rib and said rearwardly extending portion in which said portions of the case shifting and ribbon mechanisms are adapted to operate.

26. In a typewriting machine the combination with casing side walls, of a segment plate provided with an arcuate strengthening rib and integral rearwardly extending portions adapted to be secured to the casing side walls, said segment plate being provided with openings at each side of the strengthening rib and adjacent said rearwardly extending portion, carriage shifting means arranged to extend through one of said openings and means mounted on said segment plate adjacent said carriage shifting means for limiting the movement thereof in shifting the carriage.

27. In a typewriting machine as in claim 26 wherein said segment plate is provided with means associated with said limiting means for adjusting the latter and securing it in adjusted position.

28. In a typewriting machine the combination with casing side walls, of a segment plate provided with an arcuate strengthening rib and integral rearwardly extending portions adapted to be secured to the casing side wall, said segment plate being provided with openings at each side of the strengthening rib and adjacent said rearwardly extending portions, a rearwardly extending boss on the segment plate adjacent one of said openings and ribbon vibrating means pivotally mounted on said boss and operatively connected with actuating mechanism extending through said opening.

29. In a typewriting machine the combination with casing side walls, of a segment plate provided with integral rearwardly extending portions adapted to be secured to the casing side walls, an arcuate strengthening rib substantially central of said segment plate and a bent-over flange extending transversely of the casing along the lower edge of said segment plate for additionally strengthening the same.

30. In a typewriting machine having casing side walls with inturned flanges along the lower edges thereof, the combination therewith of a segment plate inclined rearwardly and provided with integral rearwardly extending end portions of the same width as the ends of the segment plate, and having their lower edges at an angle to the segment plate, the ends of the segment plate extending to said side walls so that said rearwardly extending portions are in flat engagement with the casing side walls and the lower edges thereof are in cooperative engagement with said inturned flanges of the casing side walls, said rearwardly extending portions having a plurality of holes for attaching said portions to the casing side walls at a plurality of points, the arrangement being such as to provide a rigid frame structure.

31. In a typewriting machine having casing side walls with inwardly extending flanges along the lower edges thereof, the combination therewith of a rearwardly inclined segment plate provided along the full width of its ends with integral rearwardly extending portions having their lower edges at an angle to the segment plate, said rearwardly extending portions being adapted to be secured to the casing side walls with the lower edges thereof parallel with and in cooperative engagement with said side wall flanges so that said segment plate is firmly held in its rearwardly inclined position relative to said side walls and to said flanges to thereby form a rigid frame structure.

GEORGE F. ROSE.